United States Patent [19]
Thony et al.

[11] Patent Number: 5,703,890
[45] Date of Patent: Dec. 30, 1997

[54] MICROLASER CAVITY, A SOLID STATE PULSED MICROLASER WITH ACTIVE Q-SWITCHING BY A MICROMODULATOR AND METHOD FORMING SAME

[75] Inventors: Philippe Thony, Grenoble; Marc Rabarot, Seyssinet; Engin Molva, Grenoble, all of France

[73] Assignee: Commissariat a l'Energie Atomique, Paris, France

[21] Appl. No.: 663,664

[22] Filed: Jun. 14, 1996

[30] Foreign Application Priority Data

Jun. 27, 1995 [FR] France .................. 95 07716

[51] Int. Cl.$^6$ .................................................. H01S 3/115
[52] U.S. Cl. .................. 372/12; 372/9; 372/10; 372/14; 372/26; 372/98; 372/100; 372/99
[58] Field of Search .................. 372/9, 10, 12, 372/14, 16, 26, 28, 39, 69, 70, 71, 92, 98, 99, 100, 109; 437/129

[56] References Cited

U.S. PATENT DOCUMENTS

| | | | |
|---|---|---|---|
| 5,063,566 | 11/1991 | Dixon | 372/22 |
| 5,319,653 | 6/1994 | Favennec et al. | 372/7 |
| 5,381,431 | 1/1995 | Zayhowski | 372/25 |
| 5,394,413 | 2/1995 | Zayhowski | 372/10 |
| 5,488,619 | 1/1996 | Injeyan et al. | 372/12 |
| 5,495,494 | 2/1996 | Molva et al. | 372/98 |
| 5,502,737 | 3/1996 | Chartier et al. | 372/11 |
| 5,510,291 | 4/1996 | Goossen | 437/129 |
| 5,574,740 | 11/1996 | Hargis et al. | 372/41 |

FOREIGN PATENT DOCUMENTS

| | | | |
|---|---|---|---|
| 0 653 824 | 5/1995 | European Pat. Off. | 372/12 X |
| 63 124480 | 5/1988 | Japan | 372/12 X |
| WO 94/14215 | 6/1994 | WIPO | 372/12 X |

OTHER PUBLICATIONS

Optics Letters, vol. 17, No. 17, pp. 1201–1203, Sep. 1, 1992, J.J. Zayhowski, et al., "Diode–Pumped Microchip Lasers Electro–Optically Q Switched at High Pulse Repetition Rates".

Optics Letters, vol. 17, No. 5, pp. 378–380, Mar. 1, 1992, S. Schiller, et al., "Fused–Silica Monolithic Total–Internal–Reflection Resonator".

*Primary Examiner*—Brian Healy
*Attorney, Agent, or Firm*—Oblon, Spivak, McClelland, Maier & Neustadt, P.C.

[57] ABSTRACT

The invention relates to a microlaser cavity, with active Q switching, characterized in that it comprises:

- an active laser medium (20), an input mirror (22) and an output mirror (24, 87) defining the cavity,
- a micromodulator with frustrated total internal reflection, comprising two microprisms (32, 34) made of a certain material of index $n_1$ each having at least one planar face (36, 38), the two planar faces being approximately parallel to each other and inclined on the microlaser cavity axis, thereby defining a plate (30) of a certain material of index $n_2$ less than $n_1$.
- means (44, 46, 48, 50, 52, 54) for varying the thickness of the plate.

20 Claims, 5 Drawing Sheets

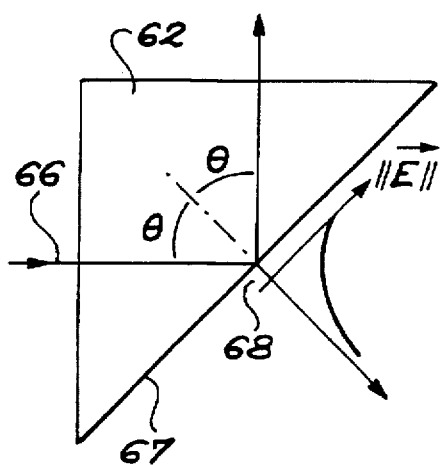 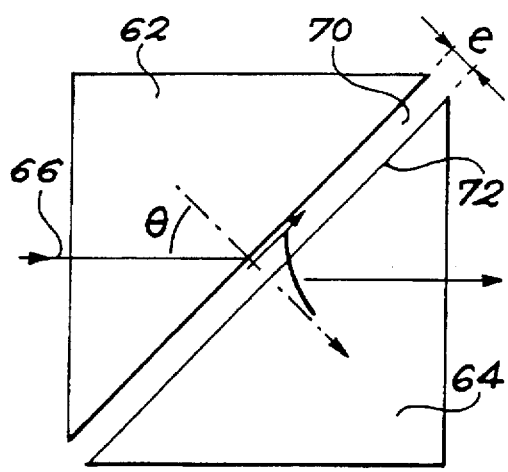
FIG. 4A      FIG. 4B
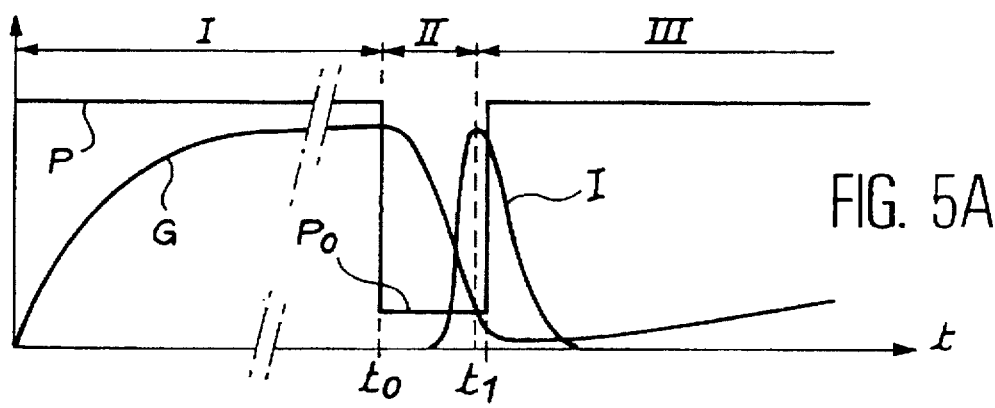
FIG. 5A
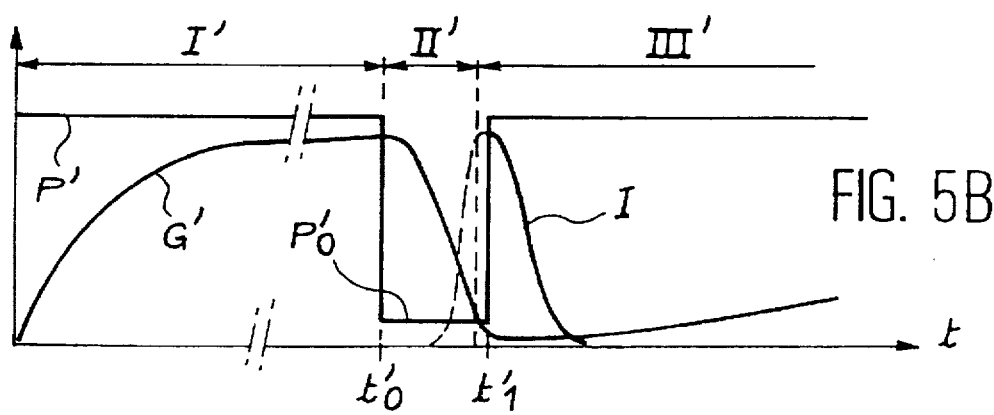
FIG. 5B

MICROLASER CAVITY, A SOLID STATE PULSED MICROLASER WITH ACTIVE Q-SWITCHING BY A MICROMODULATOR AND METHOD FORMING SAME

TECHNOLOGICAL FIELD

The invention relates to the field of solid state Q-switched microlasers.

One of the interesting features of the microlaser lies in its structure, in a stacking up of multiple layers. The active laser medium consists of a material of small thickness (between 150–1000 µm) and of small dimensions (a few $mm^2$), on which dielectric cavity mirrors are directly deposited. This active medium can be pumped by a laser diode III–V which is either hybridized directly onto the microlaser, or coupled to the latter by optic fibre. The possibility of collective manufacture using microelectronic means would allow mass production of these lasers at very low cost.

Microlasers have numerous applications in fields as varied as the automobile industry, the environment, scientific instrumentation, and telemetry.

STATE OF THE PRIOR ART

Known microlasers generally have continuous emission of a few tens of mW of power. However, most of the applications mentioned above require peak power (instantaneous power) of a few kW supplied for $10^{-8}$ to $10^{-9}$ seconds, with a mean power of a few tens of mW.

In solid state lasers, such high peak powers can be obtained by operating them in pulse mode at frequencies varying between 10 and $10^4$ Hz. For this, methods involving Q-switching of the cavity are used.

A macroscopic laser cavity can be Q switched in an active or a passive manner.

In the case of active switching the value of the losses is controlled externally by the user, for example by a rotating cavity mirror, by acousto-optical or electro-optical means. The duration of the storage, the instant of opening the cavity and the repetition rate can be selected separately.

In the field of microlasers, a technique of active switching is described in the article by J. J. Zayhowski et al., entitled "Diode-pumped microchip lasers electro-optically Q-switched at high pulse repetition rates" which appeared in Optics letters, vol. 17, No. 17, pp. 1201–1203, (1992).

In this document, the Q-switching is carried out in an arrangement of two Fabry-Perot coupled cavities. Such an assembly is illustrated in FIG. 1, where reference number 2 designates the active laser medium and reference number 4 an electro-optic switching material ($LiTaO_3$). The active medium 2 of the laser forms, with an input mirror 6 and an intermediate mirror 8, a first Fabry-Perot cavity. The switching material forms, with the intermediate mirror 8 and the output mirror 10, a second Fabry-Perot cavity. The Q-switching occurs by modifying the optic length of the Q-switching material 4 by an external action: switching electrodes 12, 14 are positioned perpendicular to the laser beam axis 16 on either side of the material 4. If a voltage V is applied between these electrodes; an electric field $E=V/e$, where e is the distance between the electrodes (which corresponds to the thickness of the electro-optic material) results from it. The optical index $n_2$ and consequently the optic length $n_2L_2$, of the electro-optic material is modified by the action of the field E. This affects the coupling of the cavities and modifies the reflectivity of the Fabry-Perot cavity formed by the mirrors 8 and 10 and by the Q-switching material 4, seen by the laser medium.

For a YAG:Nd microlaser emitting about 1.06 µm and a Q-switching material made of $LiTaO_3$ with a thickness equal to about 1 mm, the values are typically: $n_1=1.8$, $n_2=2$, $L_1=500$ µm, $L_2=900$ µm. The maximum variation of reflectivity of the second cavity is obtained for $d\lambda/\lambda=dL_2/L_2=dn_2/n_2=10^{-4}$ approximately. This index variation is obtained by applying an electric field of about $10^4$ volts/cm in the Q-switching material. It is possible to liken the second cavity (electro-optic) to an output mirror of the first cavity made of the laser material. The reflectivity of this output mirror is variable and controlled by the external control voltage applied to electrodes 12, 14. FIG. 2 shows the variation of the reflectivity R of the second cavity as a function of the applied voltage V. For the case where the three mirrors 6, 8, 10 have reflectivities respectively equal to 99%, 95% and 50%, the reflectivity of the second cavity is going to vary between 75% and 99%. Hence, for the active medium, this comes back to a variation of the reflectivity of the output mirror between 75% and 99%, through an external voltage control. In fact, it may be seen from the diagram in FIG. 2 that several hundreds of volts must be applied to obtain a reflectivity close to 90% and that about 1000 volts must be applied to obtain a reflectivity of the order of 99% and this for a distance between electrodes of 1 mm.

This type of microlaser has problems which prevent its use in practice.

First of all, the microlaser is manufactured by a manual process (it involves steps of assembling parts previously cut out). This imposes a lower limit for the geometric dimensions which are a minimum of around 1 mm, and, in particular for the distance between the two electrodes. In addition, another problem is the necessity of achieving a field E sufficient for the Q-switching. In effect, it is necessary to apply a voltage of the order of 1000 volts between the two electrodes, and this in a very short time (less than 1 nanosecond) and onto laser chips about 1 $mm^3$ in volume. This is very difficult to carry out in practice and requires sophisticated electronics incompatible with the simplicity and the low production cost of the microlaser.

Furthermore, this type of device is limited to a standard Q-switching operation, that is to say, with extraction of the pulse from the microlaser through the output mirror of the resonant cavity. This translates itself into an extra optical loss in the microlaser cavity, and into a limitation in the coupling of the energy in the beam to the outside of the cavity, hence into efficiency limited in two ways.

DESCRIPTION OF THE INVENTION

The object of the invention is an active Q-switching microlaser, characterized in that it comprises:
- an active solid medium,
- an input mirror and an output mirror defining the microlaser cavity,
- a micromodulator with frustrated total internal reflection comprising two faces approximately parallel to each other and inclined on the laser axis,
- means of varying the distance between these two approximately parallel faces.

The electrical control signals of this new device are rather weak (of the order of a few tens of volts to a few hundred volts), because on the one hand, small movements of the micromodulator faces have to be carried out and, on the other hand, the elements in the micromodulator with frustrated total internal reflection which are involved, are of low mass.

Furthermore, the microlaser cavity obtained, does not require any subsequent optical alignment operation whatsoever by the user because of its monolithic nature.

The manufacturing costs of a microlaser incorporating such a microlaser cavity are reduced since the structure described above is compatible with a collective manufacturing process of the type used in microelectronics.

The monolithic nature of the device also implies good reliability.

This type of microlaser is better suited to collective manufacture than existing Q-switched microlasers. In effect, there is no assembly step necessary, since the micromodulator can be obtained by deposition of a material chosen for its good optical quality and its index.

Finally, this type of device allows one to avoid use of a mirror having a particular transmission at the output of the microlaser cavity: this mirror can be replaced by a maximum reflection mirror and this allows a source of loss on the inside of the microlaser cavity to be eliminated.

In a microlaser according to the invention, the micromodulator comprises two inclined dioptres working in total reflection and created, for example, by two prisms separated by at least one gap, the means of varying the distance between the two faces, approximately parallel to each other and inclined on the laser axis being located in this gap.

This arrangement allows an extremely compact structure to be created.

The means for varying the distance between the two faces can be piezoelectric means. In an advantageous way, the modulator then comprises two prisms separated by at least one gap, the piezoelectric means comprising at least one piezoelectric crystal located essentially in the gap between the two prisms (dioptres).

In the case where the piezoelectric crystal is situated in the gap between the two prisms, crystal polarisation electrodes can be positioned on either side of this crystal, each of these electrodes being situated on the surface of one of the two prisms (dioptres).

Advantageously, the piezoelectric material has a high piezoelectric tensor coefficient $d_{15}$. This allows a material with a small thickness to be used.

Advantageously, the two faces, approximately parallel to each other and inclined on the laser axis are each extended, on both sides, by two planar faces, arranged perpendicular to the laser beam axis.

According to another embodiment, the means of varying the distance between the two faces can be electrostatic means.

In this case, the modulator comprises two prisms, separated by at least one gap and connected by a fixed point, the electrostatic means comprising two electrodes, each electrode being positioned on the surface of one of the two prisms, on either side of the gap.

A micromodulator is thus obtained whose control elements can be produced extremely easily, at very low cost.

According to a variant, one of the two prisms can be fitted with a microbeam on a part of which one of the electrodes is deposited.

This allows one to benefit from a greater electrode surface and hence to more easily cause movement of the two prisms, one with respect to the other.

In all cases, the microlaser cavity can be stabilized.

In the case where the output mirror is a maximum reflection mirror, a polished face can be provided on the sides of the microlaser for the output of the laser beam.

The Q-switching element with frustrated total internal reflection can be directly deposited on the active laser medium, which avoids having to assemble these elements or other optical elements on the inside of the laser microcavity, extra losses thereby being avoided.

A microlaser can comprise a laser microcavity such as that described above and means of pumping this cavity.

The invention also relates to a method of producing this cavity, comprising:

a step of forming, on an active laser medium, a micromodulator with frustrated total internal reflection, a step of forming means to vary the thickness of the plate, a step of forming the input and output mirrors of the cavity.

The formation of the micromodulator can comprise the formation of a first microprism made of a material of index $n_1$, then the formation of a second microprism, also made of a material of index $n_1$, each having at least one planar face, the two faces being approximately parallel to each other and inclined on the microlaser cavity axis.

Furthermore, there can be provided for the formation on either side of each planar face of two other planar faces, deposited approximately perpendicular to the microlaser axis.

The step of forming the means for varying the thickness of the plate can take place after the formation of the first microprism and before the formation of the second microprism.

A step of depositing a core material between the two microprisms, can also be provided for as well as a step of producing the means for optically stabilizing the cavity.

A BRIEF DESCRIPTION OF THE FIGURES

In any case, the characteristics and advantages of the invention will be more clearly apparent in the light of the description which will follow. This description concerns the examples of embodiments, given for explanatory purposes which are not limitative, with reference to appended drawings in which:

FIG. 1, already described, shows schematically, a microlaser actively Q-switched according to the prior art, FIG. 2 shows the reflectivity of the second cavity seen through the active laser medium of the first cavity in a microlaser actively Q-switched according to the prior art, FIG. 3 shows a first device according to the present invention, FIGS. 4A and 4B illustrate the principle of operation of a micromodulator, FIGS. 5A and 5B show the development of losses, of gain and of the laser pulse over time in a classic microlaser cavity and in a microlaser cavity according to the invention, FIGS. 6, 7, 8 are other examples of a device according to the invention, FIGS. 9A to 9F illustrate the manufacturing steps of a device according to the invention.

DETAILED DESCRIPTION OF EMBODIMENTS OF THE INVENTION

Figure 3:
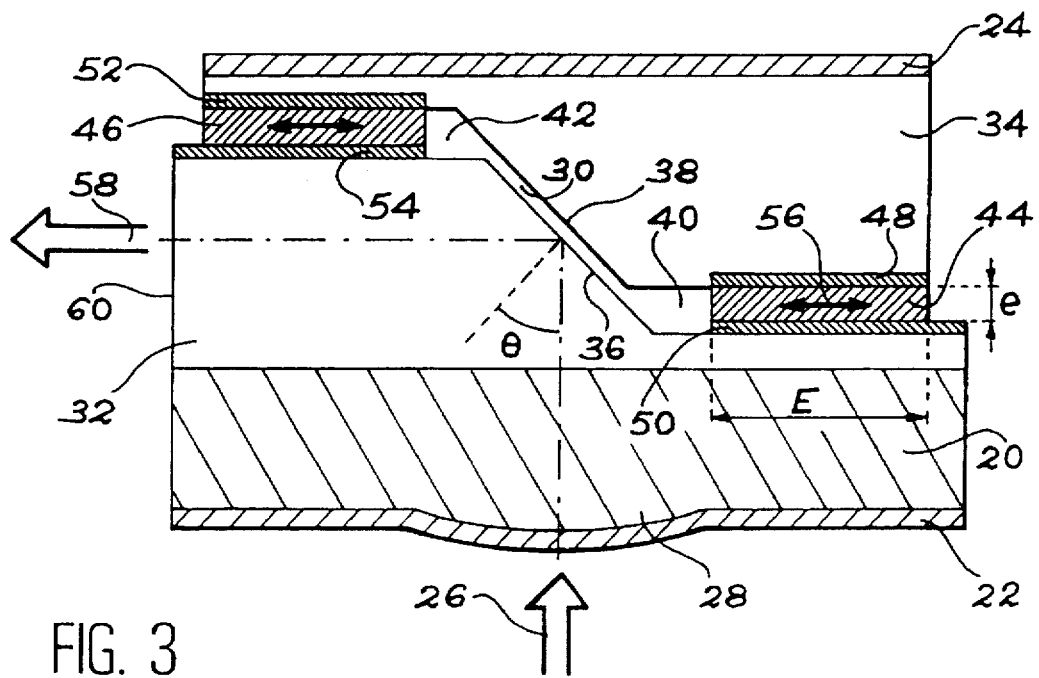

FIG. 3 shows a first example of a Q-switched microlaser, according to the invention. In this Figure, reference number 20 designates the active microlaser medium, whose base material can be chosen from one of the following materials: YAG ($Y_3Al_5O_{12}$), LMA ($LaMgAl_{11}O_{19}$), $YVO_4$, YSO ($Y_2SiO_5$), YLF ($YLiF_4$) or $GdVO_4$, etc. This base material is doped, for example, with neodymium (Nd) for a laser emission around 1.06 μm. Doping with Er or with both erbium and ytterbium, Er+Yb can equally well be chosen for an emission around 1.5 μm or doping with Tm or Ho or with both Tm+Ho for an emission around 2 μm. The thickness of the active laser medium 20 is, in practice, between 100 μm and 1 mm or a few millimeters.

Two mirrors 22, 24 close the microlaser cavity. The input mirror, deposited by known processes, will preferably be of the dichroic type and has a maximum reflectivity (the closest possible to 100%) at the wavelength of the laser and a transmission which is the greatest possible (greater than 80%) at the wavelength of the pumping beam (in general, about 800 nm for Nd doped material, about 980 nm for materials doped with Er and/or Yb, and about 780 nm for those doped with Tm).

The output mirror 24 can be a mirror having a maximum reflectivity, close to 100%, if the device is of the pulse extraction type: this allows a source of loss within the microlaser cavity to be eliminated. The device may also be with standard active Q-switching, in which case the output mirror allows a few percent of the laser beam to pass. In all cases, the output mirror is advantageously of the dichroic type.

Pumping of the cavity is preferably optical pumping. The laser diodes III–V are particularly well suited to pumping a microlaser cavity. A pumping beam is shown on FIG. 3 and designated by reference number 26, but the means for generating this pumping beam are not shown on this Figure.

Optionally, it is possible to manufacture, by a known method according to the prior art (A. EDA et al., CLEO 1992, page 282, Conference on Laser and Electro-optics, Anaheim, U.S.A.) a system of micro-lenses made in a transparent material (for example silica) on the input surface of the laser material. Typical dimensions for these micro-lenses have:

a diameter from 100 to a few microns, a radius of curvature of a few hundred micrometers to a few millimeters.

These micro-lenses allow stable planar concave type cavities to be produced. A stable cavity allows the geometry of the beam in the cavity to be well defined and allows the size of the beam to be set at the plate 30, inclined at an angle θ with respect to the microlaser axis. In fact, the smaller the size of the beam at this plate, the smaller the height to engrave in elements 32, 34: this height is of the order of 2Wtgθ, if the diameter of the beam is 2 W. A micromirror is shown on FIG. 3 and designated by reference number 28: the microlaser cavity shown in FIG. 3 is therefore a stable plane-concave cavity. The stabilisation of the cavity allows, in addition, losses there to be decreased and increases the operating efficiency.

The device in FIG. 3 additionally includes a component 32, made of a solid medium of index $n_1$. Preferably a material of good optical quality is chosen with an index which is not too small, such as, for example, silica. The component 32 comprises a face 36 inclined at an angle θ with respect to the microlaser axis. Angle θ is chosen in such a way that there is total reflection of the laser beam on this face. The latter forms a dioptre which separates the solid medium 32 and a second medium, or plate 30, of index $n_2$. In fact, the angle of incidence θ must be greater than Arcsin $(n_2/n_1)$ for there to be total reflection.

A second element 34, made of the same material as the first element 32, also has an inclined face 38, substantially parallel to face 36 and therefore at the same angle θ to the microlaser axis.

The index of the medium between the two dioptres formed by the inclined faces 36, 38 must be lower than the index $n_1$ of the solid elements 32, 34. The thickness of the plate 30, which separates the two faces 36, 38 is variable and is controlled by means which are controlled from the outside. This thickness is of the order of half the wavelength of the laser beam so as to couple the maximum energy into the emitting medium. The plate 30 is hence composed of a deformable or fluid medium, most commonly, air.

The means for varying and controlling the distance between the two faces 36, 38 can be piezoelectric. In FIG. 3, plates 44, 46 of piezoelectric material are situated in the gaps 40, 42, between the two prisms 32, 34. These plates 44, 46 are oriented, in the example in FIG. 3, perpendicular to the microlaser axis. Other arrangements are possible insofar as activation of the piezoelectric elements allow the parallel faces 36, 38 of the plate 30 to end up spaced apart or brought together. On either side of the piezoelectric elements 44, 46 are positioned control electrodes 48, 50, 52, 54. These electrodes are connected through contact components, to means which enable a certain polarisation voltage to be applied to the piezoelectric elements, (these means are not shown in FIG. 3). Advantageously, a material having a high coefficient of piezoelectric tensor $d_{15}$, for example greater than $10^{-7}$ m/V, is chosen for the piezoelectric material. One can equally take a material having a high d31 coefficient. Such a choice allows a particular movement, in a direction perpendicular to the microlaser axis (this direction is marked on FIG. 3 by an arrow designated by reference number 56) to be made more easily: in effect, the electrodes 48, 50 are spaced at a distance equal to the thickness e of the material 44, and this distance is small in comparison with the width E of this same material.

When the output mirror is at total reflection, the laser beam 58 emitted by the microlaser exits through a lateral face 60 of the device. It is shown parallel to the microlaser axis in FIG. 3, but its orientation depends on the angle of inclination θ of the plate 30 with respect to this axis. Furthermore, this lateral face 60 is preferably polished so as to favor optimum extraction of the laser beam.

The operating principle of a device conforming to the invention, that is to say Q-switching by frustrated total internal reflection will be explained with reference to FIGS. 4A and 4B. In these Figures, the modulator is represented schematically by two identical isosceles prisms 62, 64, joined by their hypotenuse to form a cube. The two prisms are separated by a plate of air 70, very thin, of the order of the wavelength of the laser beam. The laser beam 66 enters through a small side of the first prism 62, crosses it to its hypotenuse and is incident on face 67 at an angle θ. When the two prisms 62, 64 are sufficiently spaced apart (prism 64 is not shown on FIG. 4A), the beam 66 is totally reflected by the face 67 and is deflected, in its entirety, at an angle θ with respect to the normal of this face. Consequently, when the modulator is placed in the microlaser cavity, the beam is then deflected out of the cavity, which represents a loss of 100%.

In fact, in the space 68 situated on the other side of face 67, the field has an evanescent shape of the type $$\exp(-z/z_0) \text{ with } z_0 = \lambda_0/2\ \pi(n_1^2 \sin^2 \theta - n_2^2)^{-\frac{1}{2}},$$

where $\lambda_0$, is the wavelength in the void (see Optics Letters, vol. 17, No. 5, pp. 378–380), and where z is the distance with respect to face 67. Consequently, the energy is divided up in the space just behind the dioptre, but is not propagated any further. If the second prism 64 is considered (FIG. 4B), the thickness of the layer of air 70 is reduced and the dioptre of the large face 72 of the second prism 64 comes close to the evanescent wave. A part of the energy of this evanescent wave will come into contact with the second dioptre and will cross it. The wave will resume a radiative form in the medium 64 and will continue to propagate itself as it did in the first prism 62. The modulator is then in the enabling state and the level of loss it imposes within the cavity is almost zero. In the limit, the second prism can come into contact with the first, the layer of air 70 disappears and the beam passes without meeting an interface. This limiting case is ideal, since the quality of the surfaces 67, 72 is never good enough to have a total contact between them.

The changes with time and the different loss and gain conditions of an actively Q-switched microlaser cavity are shown in FIGS. 5A and 5B as well as a laser pulse obtained by Q-switching of the cavity.

Figure 1:
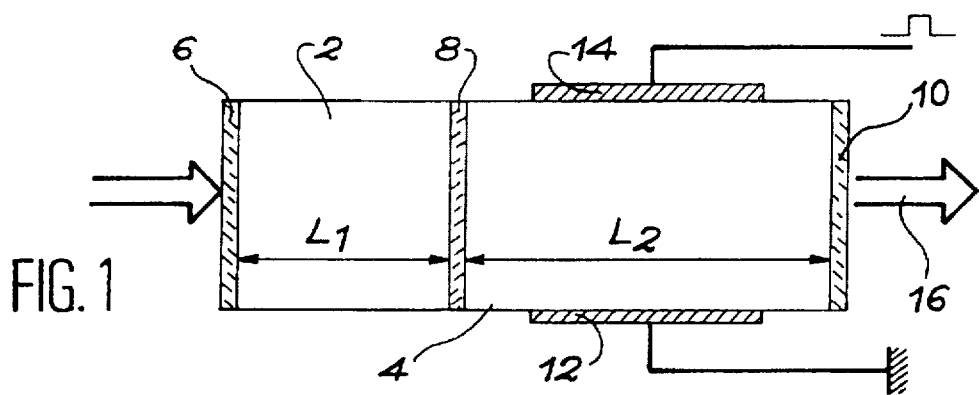
Figure 2:
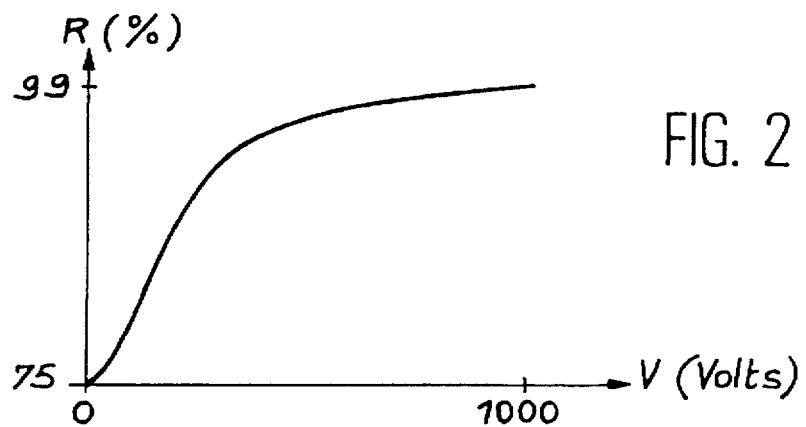

The diagram in FIG. 5A corresponds to the case of a microlaser cavity with classic active Q-switching. In the course of a first phase I, the system does not show any laser effect, since the loss level P inside the microcavity is greater than the gain G obtained through pumping. However, this gain increases, since the solid amplifier medium stores the energy of the pumping beam. The switching of the active Q-switching means, for example, the application of an adequate voltage on each side of an electro-optic material (FIG. 1) allows the losses P to be restored to a low level or zero $P_0$, and the gain G of the microcavity is then very much greater than the losses $P_0$ (phase II in FIG. 5A). As the gain is very much greater than the losses, the amplification of the light is high and this continues as long as the condition $G>P_0$ is satisfied. When the gain reaches the value of the losses (instant $t_1$ in FIG. 5A), amplification stops, but a very high laser intensity value is reached so that the emission of the laser pulse I occurs through the output mirror. Then, this intensity decreases at the rate of the photons which are leaving the microcavity, because of residual losses and the transmission of the output mirror (phase III: the losses have returned to a high level). Finally, the gain begins to increase again with the pumping effect of the amplifier material and the cycle can begin again.

In the case of a device conforming to the invention (FIG. 5B), the thickness of the inclined plate is first of all large (of the order of several times the wavelength of the laser), so that the losses P' prevent operation of the laser. However, in the course of this phase I', the amplifier medium absorbs the pump power and the gain G' increases. In the course of step II', the two components of the micromodulator come closer to each other (thickness of the plate reduced to a fraction of the wavelength of the microlaser) and the light can cross the thin plate between the two prisms. The micromodulator is open and the losses are reduced to the residual losses $P'_0$. The luminous intensity I' then rises in the cavity while the gain G' decreases. Then, as in the previous case, the intensity stabilises and begins to decrease under the effect of the residual losses. However, in contrast to the preceding diagram, no luminous pulse is emitted. In the course of a third phase III' the two components are again separated (instant $t'_1$) and the micromodulator is closed. The beam which is formed in the cavity is going to be totally reflected onto the inclined face 36 of prism 32 (FIG. 3) and the energy is going to be fully transmitted to the outside of the microlaser. Then, once the cavity has been emptied, the cycle begins again and the gain G' increases once again.

Figure 6:
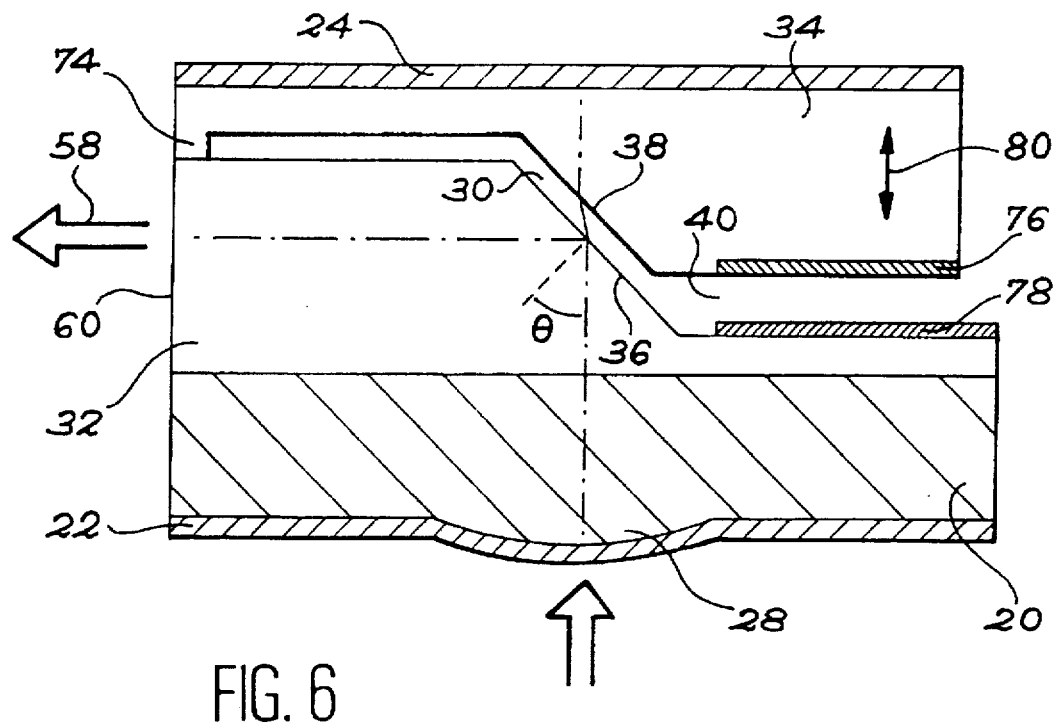

Another device conforming to the invention will be described with reference to FIG. 6. In this Figure, reference numbers identical to those in FIG. 3 designate the same elements. The two prisms 32, 34 are connected at a point 74, while the control system is of the electrostatic type. This comprises two electrodes 76, 78 advantageously located on a surface of the two prisms 32, 34 on either side of the gap 40. These electrodes 76, 78 are connected to means that enable a potential difference to be applied to them which is sufficient to bring them together or to separate them, which involves movement of prism 34 in the direction indicated on FIG. 6 by reference number 80, that is to say, essentially parallel to the microlaser axis. This movement causes faces 36, 38 to come closer to each other and restores the thickness of the plate 30 to a value of almost zero in the area where the laser beam is incident on face 36. The device then functions in the way described above with reference to FIGS. 4A, 4B and 5B. There is an emission of a laser beam 58 through a lateral face 60 of the microlaser. This embodiment has the advantage of simplicity with respect to the embodiment in FIG. 3.

A variant of this second embodiment (displacement of a second prism by electrostatic means) will be described with reference to FIGS. 7 and 8. In these Figures, reference number 82 designates a first prism, made of a material chosen preferably in accordance with the same criteria as those described above in connection with the description of FIG. 3 (good optical quality and an index which is not too low). A cavity 84 is open in this prism 82, in such a way that the latter has an inclined face 86, making an angle θ with the microlaser direction. A second prism 88 is housed in the cavity 84 which has a surface 90 parallel to surface 86. Each of the prisms 82, 88 have a face 92, 94 on which a control electrode 96, 98 is deposited. The operation of this device is the same as for the device described above with reference to FIG. 6, the distance between the faces 86, 90 being controlled by the voltage applied to the electrodes 96, 98. Seen from the output mirror side, (that is to say direction A in FIG. 7), this variant can have the appearance illustrated in FIG. 8. The moving prism 88 and the output mirror 87 are located at the end of a microbeam 100, the control electrode 98 can then be deposited, at least in part, along this micro beam. The electrode 96 is then located on the internal wall of a indentation 102 which extends opening 84 and, inside which the microbeam can be displaced, through the action of voltages applied to the electrodes 96, 98. Metal coated areas 104, 106, 108, insulated from each other, allow the desired voltages to be applied to these electrodes with the help of voltage generators 110, 112. Also shown on FIG. 8 is the path 114 of the pumping beam of the active laser medium. When the output mirror 87 is at maximum reflection, the laser beam 116 is extracted laterally from the laser microcavity.

A method of manufacturing microlasers such as described above with reference to FIGS. 3 and 6, will now be described. To create other microlaser cavity configurations, the expert will know how to adapt the different steps described below.

1)—In a first step, plates of laser material are cut out. They will be used as substrates for the following deposits and they are oriented, if necessary, in accordance with given crystallographic axes. These plates are polished on both faces, to a laser quality.

Figure 9A:
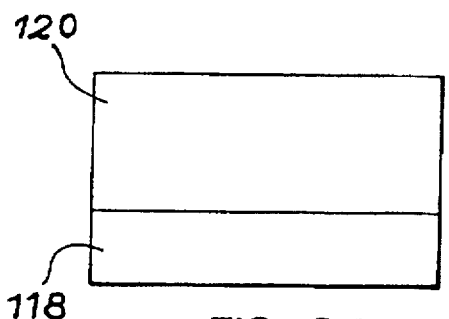
Figure 9B:
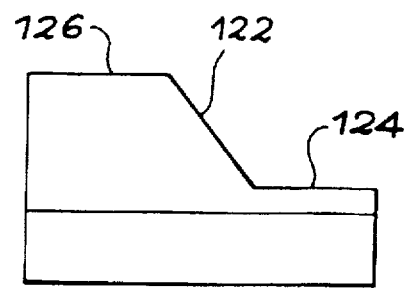
Figure 9C:
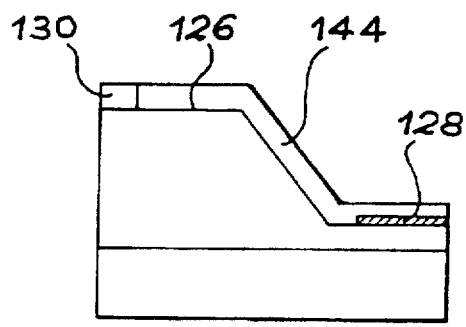
Figure 9D:
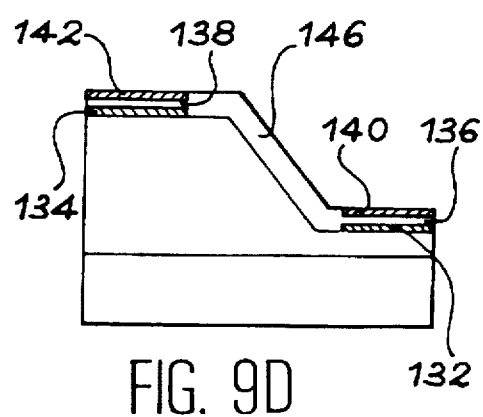

2)—As illustrated in FIG. 9A, a thick layer of silica 120 (several tens of microns thick) is deposited on a plate 118 obtained during the first step. An angled plane 122 (FIG. 9B), is engraved, using a mask of variable density or a mobile mask. It is also possible to engrave a crystallographic plane revealed by chemical attack, if a monocrystalline layer 120 of a material other than silica is being deposited. The inclined plane can also be made by hot shaping of the silica. The lower 124 and the upper 126 parts are obtained and are on both sides of the inclined plane 122.

3)—In the case of an electrostatic actuator, a metal electrode 128 is deposited on the lower horizontal part 124, at the side of the inclined plane. A block 130 of silica is engraved or deposited on the upper part 126: this block will be used as a pivot for the movement of the mobile silica part.

In the case of a piezoelectric actuator, the electrodes 132, 134 are deposited on surfaces 124, 126. On these electrodes, a deposit is then formed of a piezoelectric material 136, 138 having, for example, a high coefficient of piezoelectric tensor $d_{15}$. Then, a second electrode 140, 142 is deposited on the piezoelectric material.

The deposits are made by using masking and engraving techniques which allow a well defined actuator shape to be obtained.

4)—In the two cases described above, a core material 144, 146, for example, a resin is then deposited, for example, with a trammel. The thickness of this deposit corresponds to the thickness, of the order of a micrometer, of the layer of air that it is desirable to leave between the two inclined faces of the prisms. In the case of an electrostatic actuator, a second electrode 129 (FIG. 9E) is then deposited opposite the first electrode 128.

Figure 9E:
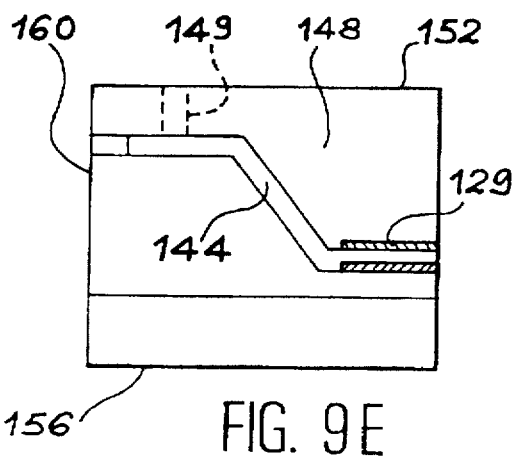
Figure 9F:
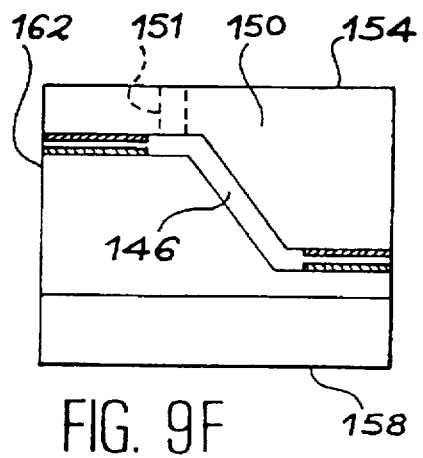

5)—A thick deposit 148, 150 of the material making up the second prism (for example silica) is then made on the layer of resin 144, 146 (FIGS. 9E, 9F). A hole 149, 151 is provided, made by masking, so as to subsequently allow access to the resin.

6)—The resin 144, 146 is chemically etched, so as to leave a layer of air between the two prisms making up the Q-switching device.

7)—The upper face 152, 154 is then made planar and polished to laser quality. The mirrors are deposited on the input face 156, 158 of the laser material and on the output face 152, 154 of the second prism 148, 150. These mirrors are planar if one wishes to make a planar-planar microlaser cavity. A stable microlaser cavity can be created by engraving the micromirrors on the input face 156, 158.

The microlaser chips are cut out, the contacts are made for the control of the piezoelectric or electrostatic actuators. A lateral face 160, 162 can be polished, to an optical quality, to allow the laser beam to leave.

The cavity thus obtained can be mounted in a casing and coupled to a pumping diode, for example, by means of an optical fiber.

All the steps of the method described above are compatible with collective manufacture of microlasers and hence with manufacture at low cost.

Figure 7:
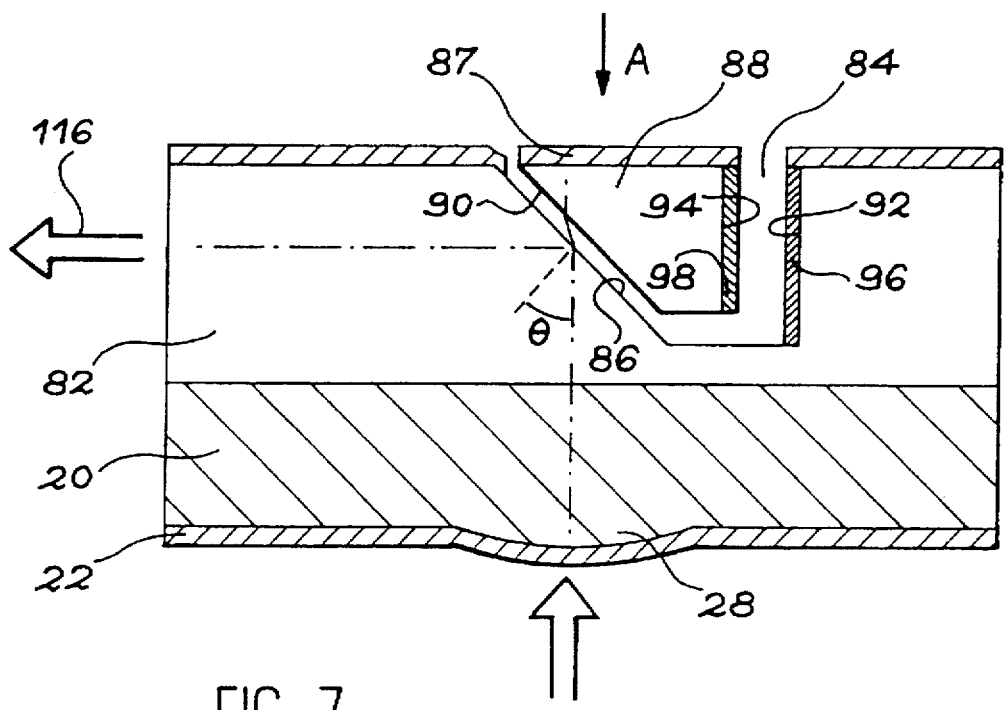
Figure 8:
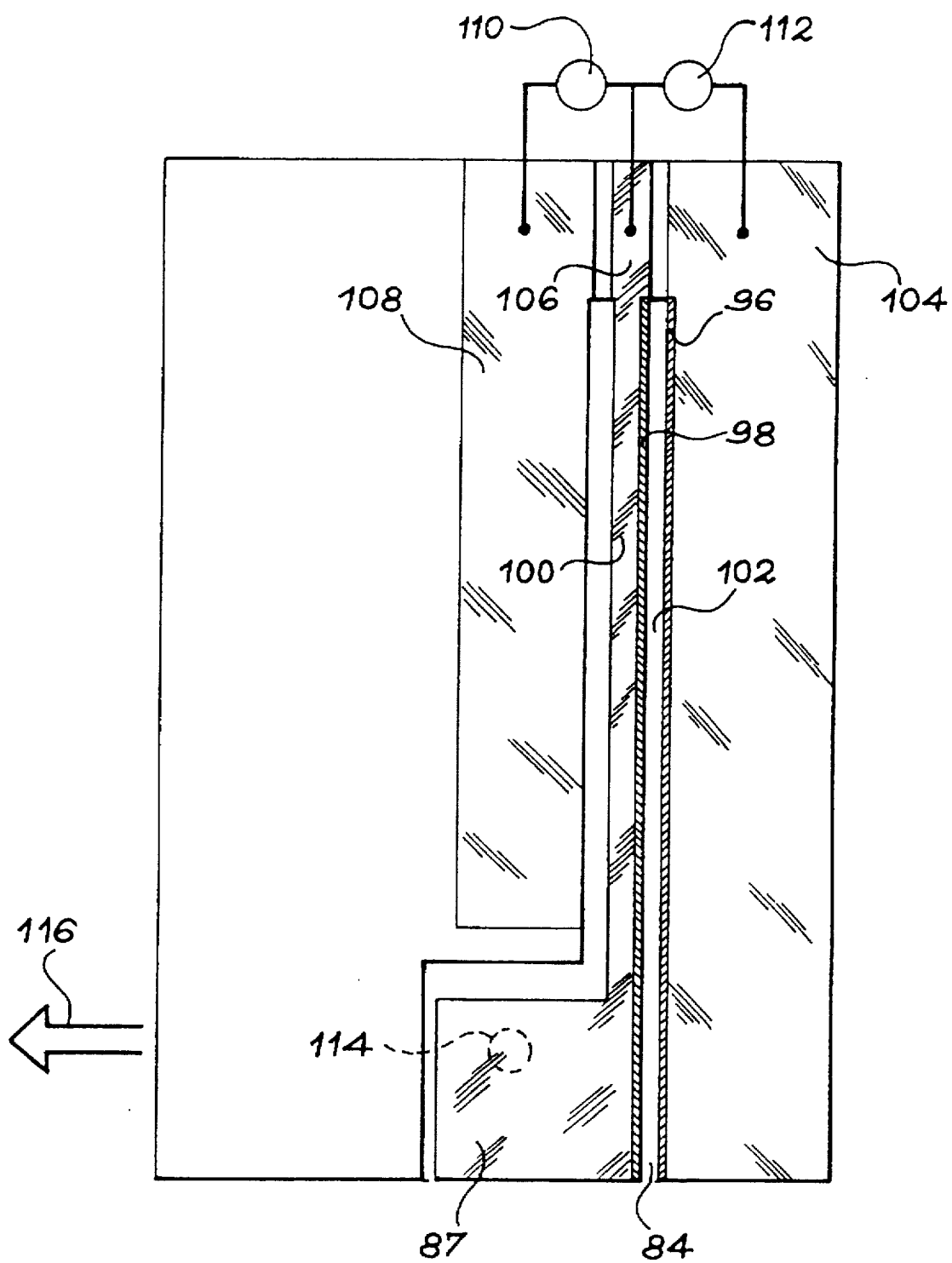

In order to make a device like the one in FIG. 7, engraving steps will be carried out to obtain different shapes of prisms, but all the techniques called upon above can be used and adapted to the production of such a device. The same applies for any other shape of prism.

We claim:

1. A microlaser cavity with active Q switching comprising:

an active laser medium, an input mirror and an output mirror defining the cavity, a micromodulator with frustrated total internal reflection, comprising two microprisms made of a certain material of index $n_1$ each having at least one planar face, the two planar faces being approximately parallel to each other and inclined onto the microlaser cavity axis, thereby defining a plate of a certain material of index $n_2$ less than $n_1$, means for varying the thickness of the plate.

2. A microlaser cavity according to claim 1, the means for varying the thickness of the plate being essentially situated between the two microprisms.

3. A microlaser cavity according to one of claims 1 or 2, the two faces which are approximately parallel to each other and inclined on the laser axis being each extended on both sides by two planar faces positioned approximately perpendicular to the microlaser cavity axis.

4. A microlaser cavity according to one of claims 1 or 2, the means for varying the thickness of the plate being piezoelectric means.

5. A microlaser cavity according to claim 4, the piezoelectric means comprising at least one piezoelectric crystal essentially situated in the gap between the two prisms.

6. A microlaser cavity according to claim 5, the polarization electrodes of the piezoelectric crystal being positioned on either side of this crystal, each of these electrodes being situated on a face or on the surface of one of the two prisms.

7. A microlaser cavity according to claim 4, the piezoelectric material having a high coefficient of piezoelectric tensor $d_{15}$.

8. A microlaser cavity according to one of claims 1 or 2, the means for varying the thickness of the plate being electrostatic means.

9. A microlaser cavity according to claim 8, the two prisms being connected through at least one fixed point, the electrostatic means comprising two electrodes, each being positioned on a face or on the surface of one of the two prisms.

10. A microlaser cavity according to claim 9, one of the two prisms being fitted with a microbeam on a part of which one of the electrodes is at least partially deposited.

11. A microlaser cavity according to one of claims 1 or 2, the cavity being stabilized.

12. A microlaser cavity according to one of claims 1 or 2, the output mirror of the cavity being a maximum reflection mirror, a polished face being additionally provided, on the sides of the microlaser for the output of the laser beam.

13. A microlaser cavity according to one of claims 1 or 2, the micromodulator being deposited directly on the active laser medium.

14. A microlaser comprising a microlaser cavity according to one of claims 1 or 2, and cavity optical pumping means.

15. A method of manufacturing a microlaser cavity with active Q switching comprising:

a step of forming, on an active laser medium, a micromodulator with frustrated total internal reflection, a step of forming means to vary the thickness of the plate, a step of forming the input and output mirrors of the cavity.

16. A method according to claim 15, the formation of the micromodulator comprising the forming of a first microprism made of a material of index $n_1$, then the forming of a second microprism also made of a material of index $n_1$, each having at least one planar face, the two faces being approximately parallel to each other and inclined on the microlaser cavity axis.

17. A method according to claim 16, comprising, in addition, the forming on both sides of each planar face, of two other planar faces, positioned substantially perpendicular to the microlaser axis.

18. A method according to one of claims 16 or 17, the step of forming the means for varying the thickness of the plate occurring after the forming of the first microprisms and before the forming of the second microprism.

19. A method according to one of claims 16 to 18, also comprising a step of depositing a core material between the two microprisms.

20. A method according to one of claims 15 to 18, comprising, in addition, a step of producing means for optically stabilizing the cavity.

* * * * *